United States Patent [19]

Palmer

[11] 4,088,363
[45] May 9, 1978

[54] TRUCK CAMPER TENT
[76] Inventor: Dean Palmer, 24001 S. Avalon, Carson, Calif. 90745
[21] Appl. No.: 641,302
[22] Filed: Dec. 16, 1975

Related U.S. Application Data
[63] Continuation-in-part of Ser. No. 554,411, Mar. 3, 1975.

[51] Int. Cl.² .............................................. B60P 3/34
[52] U.S. Cl. ............................. 296/23 MC; 135/4 A; 296/23 A
[58] Field of Search ............. 296/23 R, 23 MC, 23 A, 296/23 H, 23 C, 23 D, 23 E, 23 F, 23 G, 26, 10; 135/1 A, 3 A, 4 A

[56] References Cited
U.S. PATENT DOCUMENTS

| | | | |
|---|---|---|---|
| 2,459,026 | 1/1949 | Hardy | 296/23 A |
| 2,513,411 | 7/1950 | Heil | 296/23 E X |
| 2,826,210 | 3/1958 | Heil | 135/4 A |
| 2,960,992 | 11/1960 | Klipfel | 135/4 A |
| 3,297,355 | 1/1967 | Robinson | 296/23 MC |
| 3,475,049 | 10/1969 | Overhulser | 296/23 MC |
| 3,697,122 | 10/1972 | Richards | 296/23 R |
| 3,773,379 | 11/1973 | Loiseau | 135/4 A X |
| 3,823,975 | 7/1974 | Cooper | 296/23 R |

FOREIGN PATENT DOCUMENTS

| | | | |
|---|---|---|---|
| 1,214,706 | 4/1960 | France | 296/23 E |
| 98,280 | 1/1961 | Netherlands | 296/23 E |
| 652,124 | 4/1951 | United Kingdom | 296/23 E |

Primary Examiner—John P. Silverstrim
Attorney, Agent, or Firm—Georges A. Maxwell

[57] ABSTRACT

A combination pick-up truck and camper tent comprising a frame unit in the truck bed, a flat panel fixed to the hinged tailgate of the bed to normally occur in a horizontal plane above in the truck bed and said frame unit and pivotally shiftably to extend horizontally rearward from the bed and establish a tent floor when the gate is pivoted open, a plurality of normally horizontally disposed U-shaped bows pivoted to the frame unit adjacent the gate and below the panel and shiftable to extend forwardly and upwardly, vertically and rearwardly and upwardly from their pivoted axes and a flexible tent skin with edges fixed to related edges of the frame unit and the panel and joined with the bows to normally occur folded below the panel and shiftable with the panel and the bows into taut relationship between said frame and panel and about said bows when said gate is pivoted open.

9 Claims, 11 Drawing Figures

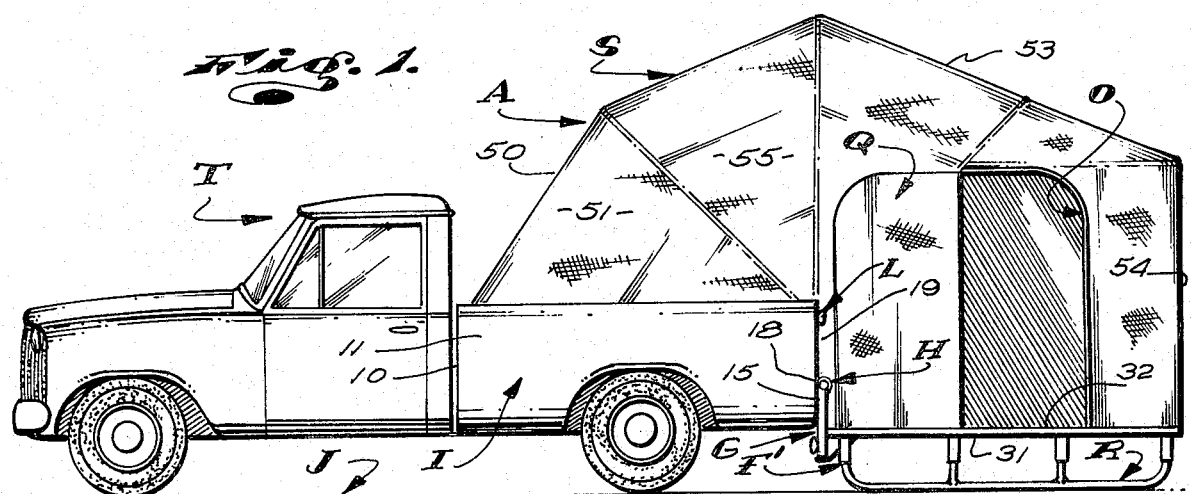
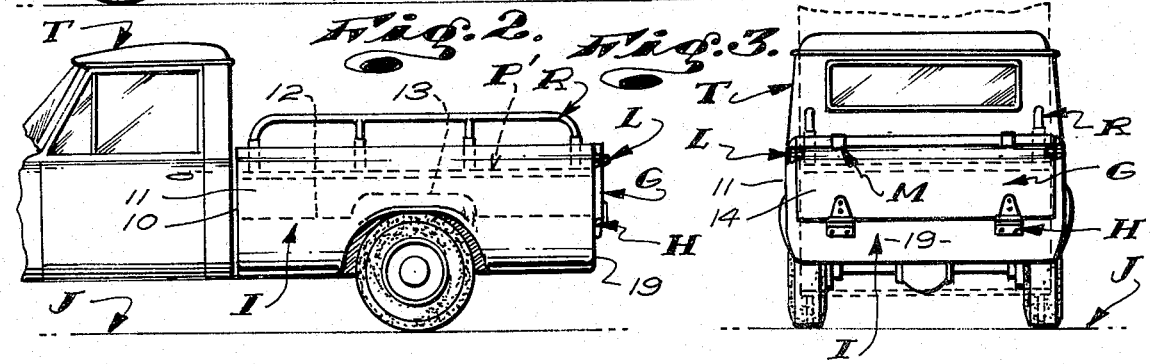
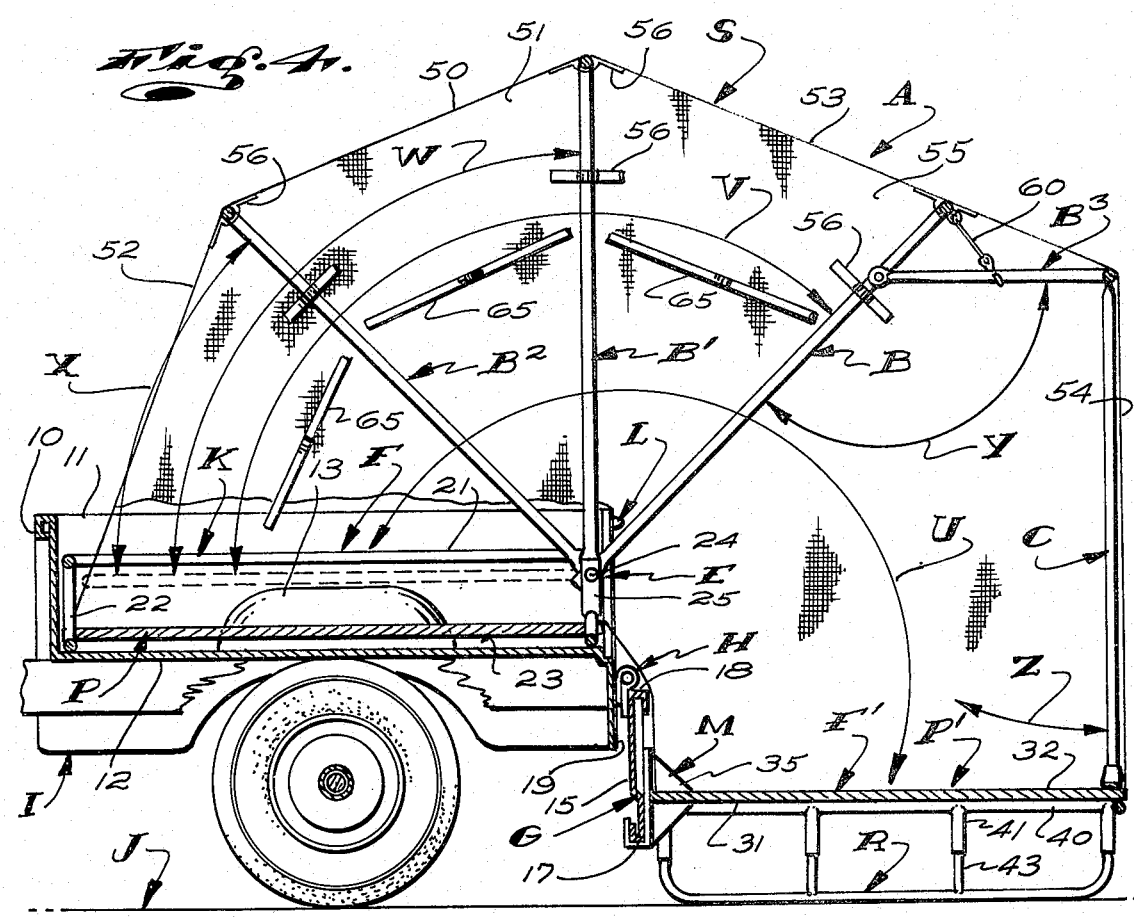

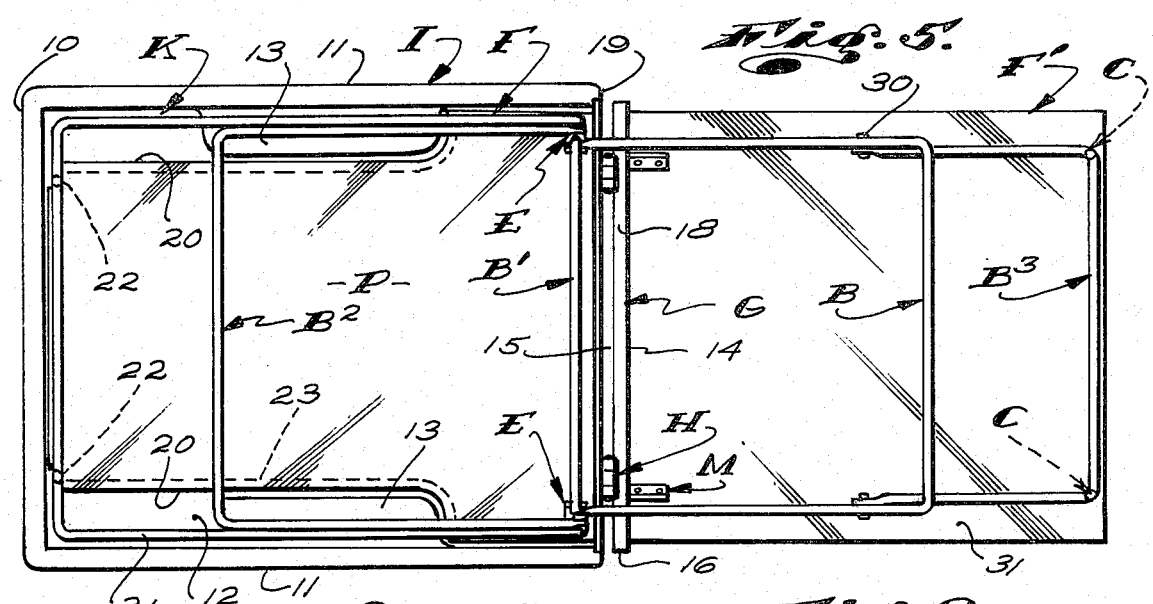
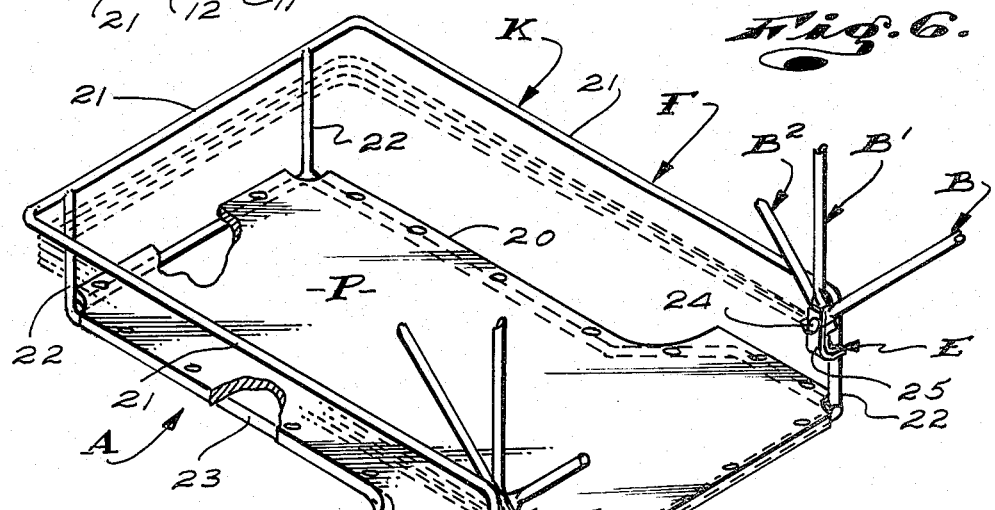
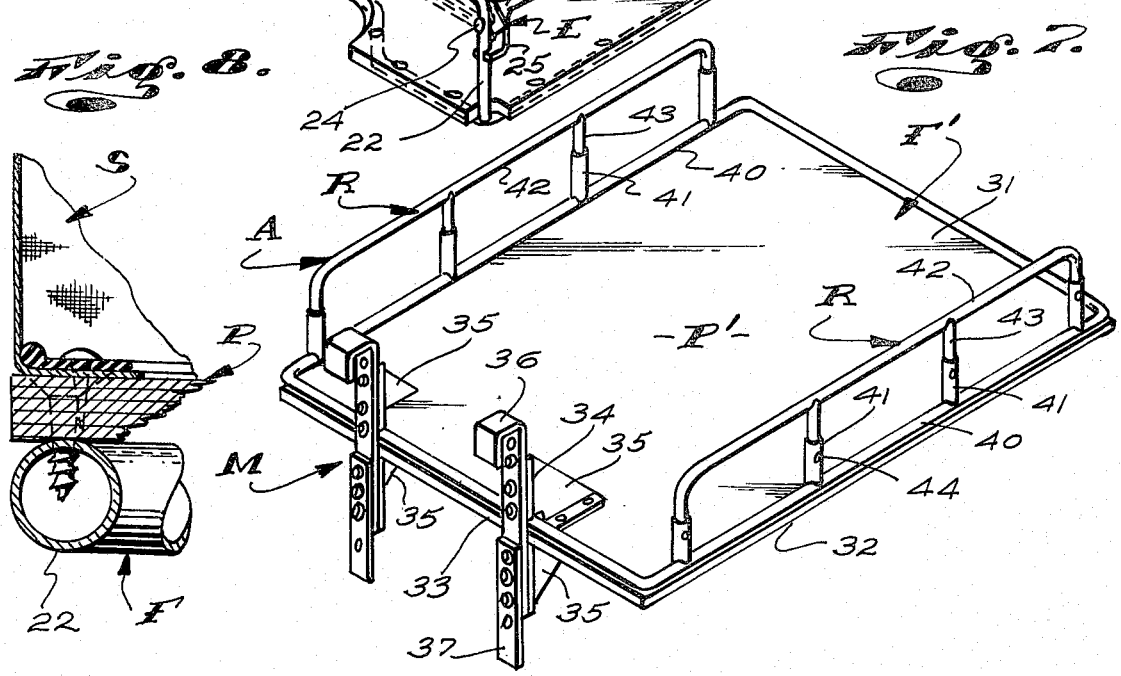

TRUCK CAMPER TENT

This is a continuation-in-part of U.S. Patent application Ser. No. 554,411, filed Mar. 3, 1975 for TRUCK CAMPER TENT.

This invention has to do with a recreation vehicle for camping and the like and is more particularly concerned with a combination pick-up truck and camping tent.

In that segment of the field or art of recreation having to do with travel and camping, there is an ever increasing use of special motor vehicles provided or equipped with sleeping or living accomodations. The most common of such vehicles comprises a pick-up truck with a rigid box-like shelter unit which is generally equipped with sleeping and cooking facilities. Such vehicles are commonly referred to as campers.

The principal shortcomings found in campers reside in the high cost of the shelter units; the fact that the units are large and heavy and result in material decreases in the efficiency of operation of trucks with which they are related. The units generally adversely affect the geometry of their related trucks, rendering them hazardous to operate; and, the units are essentially and from a practical standpoint permanently engaged on and with their related trucks, rendering the utility beds of the trucks completely occupied and unusable for any other purpose.

In those instances where the owners or operators of recreational pick-up trucks do not have or desire to have a camper unit, it is common practice for them to equip themselves with conventional camping tents, which tents can be stored and transported in the utility beds of the truck, along with other desired equipment, and which can be removed from the truck and set up, as desired.

The principal shortcoming to be found in the above noted use of conventional camping tents resides in the fact that they are generally inconvenient and difficult to set up and to take down and must be set up directly on the ground.

As an alternative to the common camper and the ordinary camping tent, the prior art has provided trailer units with folding extensible tent structures built or incorporated therein. While such units have and/or provide many advantageous features, they are considered by many persons to be extremely undesirable since they are separate wheeled units which must be coupled with a draft vehicle and towed. The many disadvantages associated with the towing of trailer units or the like are well known and need not be presently recited.

Referring once again to the above noted camper units, a principal shortcoming therein resides in the fact that the size of the units is limited or restricted in longitudinal extent to the longitudinal extent of the utility beds of the pick-up trucks with which they are related.

While it is common practice to lengthen the units and permit them to extend rearward from their related truck beds, such practice is not desirable and is subject to definite limitations.

It is an object and feature of my invention to provide a novel camping tent unit adapted to be releasably engaged in and with the utility bed of a related pick-up truck.

Another object and feature of my invention is to provide a camping tent unit of the character referred to which is such that it can be easily, conveniently and quickly engaged with or removed from engagement with its related truck for use or for storage, as desired, or as circumstances require.

Still another object and feature of the present invention is to provide a combination pick-up truck and camping tent unit which is such that when the tent unit is folded or collapsed, it occurs within the confines of the utility bed of the truck and establishes a flat cover thereover or false bed therein, on which other cargo and equipment can be supported and so that the basic utility of the bed is not totally forfeited.

It is yet another object and feature of the present invention to provide a structure of the character referred to above wherein elements of the tent unit are releasably connected with a conventional or standard tailgate pivoted at the rear end of the bed and in such a manner that the tailgate and the pivot or hinge means therefor becomes elements or parts of the combination of elements and parts going to make up the tent unit.

Another object and feature of the instant invention is to provide a structure of the character referred to wherein the tent unit is shiftable upwardly and rearwardly from a folded or collapsed position in the truck bed to an open extended position where it is substantially equal to or greater in vertical extent than the longitudinal extent of the bed and is substantially twice the longitudinal extent of the bed.

Still further, it is an object and feature of the present invention to provide a structure of the character referred to above wherein the tent unit includes a flat top deck element or unit which establishes the false bottom of the bed when the tent unit is folded down and in the bed and which establishes a tent floor, extending rearward of the bed on a horizontal plane below the plane of the bed when the tent unit is in its unfolded or extended position.

It is another object of this invention to provide a tent unit of the general character referred to which is such that it establishes and defines storage space within the truck bed and below the deck element or unit when in its folded position.

It is an object and feature of my invention to provide a tent unit of the character referred to including side rails on the deck element which projects upwardly therefrom and above the confines of the truck bed when the tent unit is in its folded position and which serves to retain cargo supported on top of the deck element and which engage the ground and support the deck element in horizontal spaced relationship above the ground when the tent unit is in its open, unfolded or extended position.

An object and feature of the present invention is to provide a structure of the character referred to which is light weight, easy and economical to manufacture, easily engaged with a related pick-up truck and which is such that a single man, of average size and strength, can easily and conveniently operate and shift the tent structure between its extended and folded positions in less than 30 seconds.

The foregoing and other objects and features of my invention will be fully understood and appreciated from the following detailed description of a typical preferred form and carrying out of the invention throughout which description reference is made to the accompanying drawings, in which:

FIG. 1 is a side elevational view showing the tent unit in its extended, open, position;

FIG. 2 shows the structure in its folded or collapsed position;

FIG. 3 is a rear view of the structure;

FIG. 4 is an enlarged detailed sectional view of a portion of the structure;

FIG. 5 is a plane view of the tent frame structure;

FIG. 6 is an isometric view of a part of the frame structure;

FIG. 7 is an isometric view of another part of the frame structure;

FIG. 8 is a detailed view showing the manner in which the tent skin is fixed to the frame structure;

Figure 9:
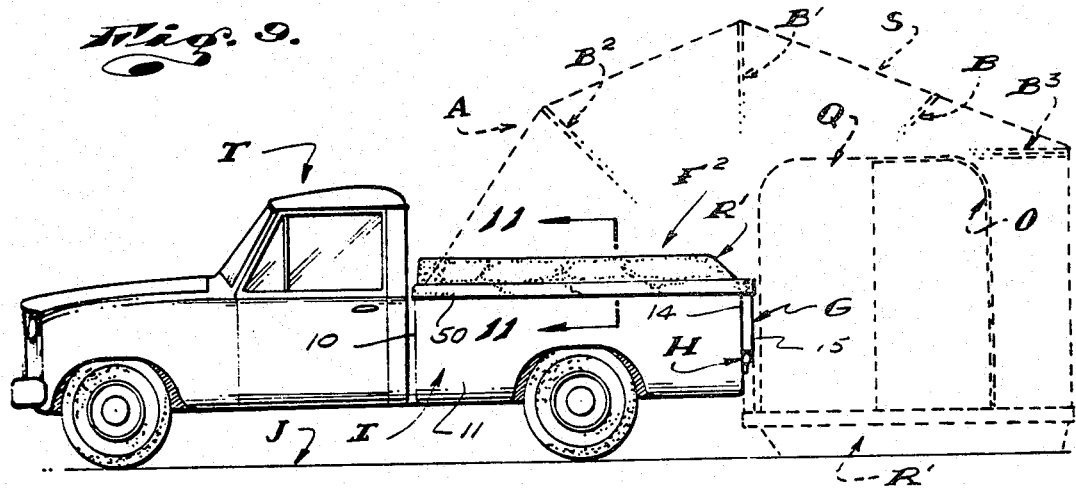
FIG. 9 is a view similar to FIG. 1 showing another form of my invention.

Referring to the drawings, the tent structure A that I provide is related to the bed I of a pick-up truck T and to or with the tailgate G of the bed I.

The truck T is a standard, conventional, elongate pick-up truck with front and rear ends and is characterized by supporting wheels, a forward engine compartment, a rear utility bed I and a central cab. The bed I is an elongate upwardly and rearwardly opening box-like structure extending longitudinally rearward from the truck cab. The bed I is defined by vertical front and side walls 10 and 11 and a flat horizontal bottom wall or floor 12. The front and side walls are of limited vertical extent and have straight top edges on a common horizontal plane.

In accordance with common practice, the rear wheels of the truck occur below the opposite sides of the floor 12, between the front and rear ends of the bed. The floor 12 and the adjacent side walls 11 are relieved and are provided with wheel wells 13 to accommodate the wheels, which wheels are subject to moving into the wells as when the truck is in use. The wells 13 project laterally and upwardly into and occupy a portion of the bed, as shown in FIGS. 4 and 5 of the drawings.

The tailgate G is a substantially flat, rectangular, rigid unit normally disposed vertically and extending transverse the open rear of the bed to close said rear end of the bed. The gate has substantially flat front and rear surfaces 14 and 15, vertical ends 16 and top and bottom edges 17 and 18. The top edge normally occurs in a common plane with the top edges of the side walls 11. The bottom edge 18 occurs below the plane of the floor 12, extends transverse the rear end 19 of the truck bed structure and is pivotally mounted to the bed structure by a pair of laterally spaced hinges H.

The gate is releasably held in its up or closed position, as shown in FIGS. 2 and 3, by manually operable latches L secured on and between the ends of the gate and their related side walls of the bed.

The gate, upon release of the latch means L, is pivotally shiftable rearwardly and downwardly 180° to a vertical, down or opened position, as shown in FIGS. 1, 3 and 5 of the drawings.

While in practice, the details of construction of the utility beds and their related tailgates, hinge and latch means varies from one make and/or model of pick-up truck to another, the combination and relationship of parts illustrated and described above is substantially basic and can, with few exceptions, be considered standard so far as the instant invention is concerned.

The tent structure A that I provide includes, basically, a primary frame unit F, bows pivotally carried by the unit F, a secondary frame unit F', the tailgate G and hinges H, related to the unit F', columns C and a fabric skin S fixed and/or related to the aforementioned units and parts.

The primary frame F is preferably a unitary structure and is characterized by a flat horizontal floor panel P normally engaged on and supported by the bottom wall or floor 12 of the bed I. The floor panel P is preferably established of plywood and is adapted to be slid, longitudinally into and out of engagement in the bed from the open rear end thereof.

So as to facilitate engagement of the panel P in the bed, the forward side portions of the panel are relieved as at 20 to accommodate the wheel wells 13 as clearly shown in FIGS. 5 and 6 of the drawings.

The unit F is next characterized by horizontal stop means K extending along or about the front and side walls 10 and 11 of the bed I in vertical spaced relationship above the panel P and wheel wells 13 and below the plane of the top edges of the said front and side walls 10 and 11 and by laterally spaced pivot means E, for the bows, at the opposite sides of and in vertical spaced relationship above the rear end of the panel P, immediately forward and inward of the open rear end of the bed I.

As shown, the stop means K can comprise a U-shaped tube section 21 supported by spaced integrally connected vertical tubular supports 27 which extend upwardly from the plane of the panel P.

Further, in practice, the panel P is provided with rectangular reinforcing frame or tube member 23 under and about its outer perimeter or edge portion and with which the supports 22 are integrally connected.

The pivot means E includes horizontal, laterally inwardly projecting pivot pins 24 carried by the vertical supports 22 at the rear corners of the frame unit, as clearly shown in FIG. 6 of the drawings. The inner ends of the pins 24 are shown supported by L-shaped brackets with horizontal bases fixed to the supports 22 below the pin 24 and vertical legs spaced laterally inward of the supports 22 and having apertures through which related ends of the pins are engaged. The other or outer ends of the pins are engaged through apertures in the supports. The pins 24 can be established by simple bolts and retained in position by their heads and related nuts.

The various related tubular parts of the unit F are welded together and the panel P is secured to the tube member 23 by suitable mechanical fastening means whereby the unit F is a strong, light-weight integrated unit and such that it can be easily and conveniently slid into and out of engagement in the bed, when the tailgate G is in its down position and the rear of the bed is open.

It is to be noted that while the primary frame unit F is preferably coextensive with the bed B, both longitudinally and laterally, it can be made shorter than the bed, so as to occupy the rear half or three quarters thereof and could, if necessary be made narrower than the bed.

The bows that I provide and which are related to the primary frame F are simple, light-weight, U-shaped tubular units having horizontal, laterally extending bases 30 and elongate, laterally spaced parallel legs 31. The free ends of the legs 31 are provided with flattened apertured free ends related to the pivot means E and through which the pivot pins 25 are engaged.

In the case illustrated, I have shown the tent structure A including three main bows B, B[1] and B[2] and a secondary bow $B^3$. The bow $B^2$ is the longest and widest bow and occurs foremost in the structure when the tent is up. Bow $B^2$ will be referred to as the forward outside bow. Bow $B^1$ is narrower and shorter than bow $B^2$ so as to engage within bow $B^2$ and occurs centrally and vertically when the tent structure is up or open. Bow $B^1$ will be referred to as the central intermediate bow. Bow B is narrower and shorter than bow $B^1$ so as to occur within the confines or limits of bow $B^1$ and occurs rearward of bow $B^1$ when the tent is up or open. Bow B will be referred to as the inner rear bow.

Bow $B^3$ is a short secondary U-shaped bow pivotally carried by and within the inner rear bow B, as by means of simple pivot pin 30. The bow $B^3$ is manually shiftable, in the direction indicated by arrow Y, from a horizontal disposition where it projects rearwardly from the bow B, as shown in FIGS. 1, 4 and 5 of the drawings, to a folded position, parallel and within the confines of the bow B, to facilitate desired and effective folding down of the structure.

The bow B, with the bow $B^3$ in its folded in position is pivotally shiftable from the up or open position illustrated, forwardly and downwardly as indicated by arrow V, to a down or folded, substantially horizontal position within the frame unit F, as shown in dotted lines in FIG. 4 of the drawings. The bows $B^1$ and $B^2$ are pivotally shiftable, as indicated by arrows W and X, forwardly and downwardly, into the confines of the frame unit F in like manner to the bow B.

The frame unit F and bows B, $B^1$, $B^2$ and $B^3$ establish an integrated unit or assembly.

By making the several bows progressively shorter they can, when the tent structure is folded occur in a single plane, with resulting conservation of space within the frame structure. In practice, however, sufficient vertical space occurs between the stop means K and the panel P to accommodate the folded down bows in a vertical stacked relationship, as would occur if the bows were all the same length.

It is to be understood that in practice, the several bows B, $B^1$ and $B^2$ need not be carried by common pivot pin, as shown, but could, if desired, be independently pivotally mounted without departing from the spirit of my invention. Such independent pivotal mounting could be effected by three sets of plate supported pivot pins, one for each of said bows, arranged in appropriate longitudinal and vertical spaced relationship in the areas of the frame unit F at which the pins 24 are arranged.

The tent structure A next includes the secondary frame unit F' releasably fixed to and cantilever supported on the tailgate G.

The frame unit F' includes a flat, horizontal deck panel P' with a top bed surface 31 and a bottom floor surface 32. The panel P', when in its normal, horizontal position, and when the tent structure is folded down, overlies and rests in stopped, supported engagement on the member 21 of the frame F and which defines or establishes the stop means K. Accordingly, the deck panel P', and more particuarly the top bed surface 31 thereof establishes a false floor within the bed I, above the floor panel P and the floor 12 of the bed and upon which cargo and the like can be effectively and conveniently engaged for transport. It is to be noted, that if the bed I is 16 inches deep and the tent structure A, when folded, is 8 inches deep, the effective depth of the bed is 8 inches deep and is still of sufficient depth for normal effective use.

The secondary frame F' next includes tailgate engaging releasable mounting means M, which means secures the panel P' in cantiliver supported engagement with the tailgate and in a plane at right angle or normal to the plane of the tailgate G.

The mounting means M can vary widely in practice, but is presently believed to require two laterally spaced mounting units, each including a first part 34 fixed to the normal rear edge 33 of the panel P' and including gusset plates 35 to afford desired cantilever support between said part 34 and the panel.

In addition to the first part 34 and gusset plates 35, the means M include secondary and/or other parts adapted to releasably engage and to secure the said first part in rigid, non-movable, non-yielding relationship with the gate G. In the case illustrated, the means M includes hooked bars 36, screw fastened to the parts 34 and engageable over the upper edge 17 of the gate G and retaining bars 37 screw fastened with the bars 36 and/or the part 34 and engageable in that normally upwardly opening channel commonly occurring along the lower or bottom edge 18 of the gate and accessible at the front surface 14 thereof. The bars 36 and 37 are adjustable vertically relative to the part 34 and to each other whereby the mounting means can be adjusted to engage gates of different vertical extent and so that the panel P' can be set to engage the stop means K when the tailgate is in its normal, up or closed position.

The frame unit F' thus far described, the tailgate G and the hinges H securing the gate to the truck bed I, as well as the bed I establish an integrated assembly which, but for the tent skin or fabric, is separate or independent of the frame unit F.

The panel P' and gate G are adapted to be pivoted relative to the truck bed I, about the axis hinges H, 180° from the normal closed position shown in FIGS. 2 and 3 of the drawings to the open position shown in FIGS. 1, 4 and 5 of the drawings. The tailgate G is thus moved from a closed position where it extends vertically upwardly from the hinges H to an open position where it extends vertically downwardly from the hinges H and the panel P' travels through the arc indicated by the arrow U, to extend horizontally rearwardly from the truck bed on a plane spaced below the bed floor 12 and above the ground J and where its floor surface 32 is disposed upwardly and its bed surface 31 is disposed downwardly.

The frame unit F next includes side rail means R which rails serve two functions. First, when the structure A is in its normal closed or folded down position, the rail means establish vertically projecting, longitudinally extending extensions of or for the side walls 11 of the bed I and when the structure is in its opened, up position, the rails serve as ground engaging support rails for the deck panel P', as clearly illustrated in the drawings.

The rail means R can vary widely in form and are shown as tubular assemblies fixed to a tubular, rectangular, reinforcing frame 40 member fixed to the deck surface 31 of the panel P'.

The means R illustrated includes longitudinally spaced, vertical tube supports 41 along the opposite sides of the panel P', a horizontal, longitudinally extending rail 42 above each side of the panel and vertical members 43 on the rails telescopically engaged in the supports 41.

The members 43 are secured in desired relative longitudinal position in the supports by fasteners 44.

With the means R set forth above, it will be apparent that the vertical position of the rails 42 can be adjusted to engage the ground to effectively support the panel P' when the panel is in its horizontal, open position.

While the tubular nature of the means R is considered desirable from the standpoint of weight, it will be apparent that the means R could be effectively established by pairs of vertical, overlapping and relatively shiftable, plywood panels or the like, without departing from the spirit of my invention.

The structure that I provide next includes the tent fabric or skin S. The skin S is preferably established of a light weight easily foldable woven fabric. The skin S includes an elongate, central section 50 which extends from the front edge of the panel P, upwardly and rearwardly over the bows B, $B^1$, $B^2$ and $B^3$ and thence downwardly to the front edge of the panel P', when the structure A is in its open or up position, and flat vertical side sections 51 extending from the side edges of the panels P and P' to the side edges of the section 50, with which they are secured (as by stitching) when the structure A is in its up or open position and as shown in FIGS. 1 and 4 of the drawings.

The section 50 establishes the front wall 52, top 53 and rear wall 54 and the sections 51 establish the side walls 55 of the tent structure.

The skin S is provided with fabric retaining straps 56 on the inside surface thereof to engage about the bows B, $B^1$ and $B^2$ and to retain the skin in desired position or relationship with said bows when the structure is moved from one position to another and to hold the bows in proper position when the structure is in its up or open position.

The lower edges of the sections 50 and 51 are fixed to their related adjacent edges of the panels P and P' in the manner illustrated in FIG. 8 of the drawings or in any other suitable desired manner.

In practice, an access opening O is out in one of the side walls 55, above the panel P', or in the rear wall 54. The material of the skin freed by establishment of the opening O is left as a flap-like closure Q for the opening O. A zipper or other suitable releasable fastening means is provided to secure the closure Q in its closed relationship with the opening.

The structure A that I provide next and finally includes means to hold the bow $B^3$ in its horizontal rearwardly extending, skin supporting position, when the structure is open. In the case illustrated, the means provided for this purpose includes a pair of manually engageable, vertical, rear corner columns C engaged between related corners of the panel P' and the bow $B^3$. The columns C are equipped or formed at their upper ends to establish pinned engagement with the bow $B^2$ and are provided with non-skin cane tips at their lower ends to engage the panel P', as shown in FIG. 4 of the drawings.

In practice, a simple hook like support such as is shown at 60 could be provided to support the bow 53, however, the columns C are considered desirable as they serve to provide necessary support to better define the inside rear corners of the opened tent.

In use and operation of my invention, the tent structure is in its normal down or folded condition within the truck bed I as illustrated in FIGS. 2 and 3 of the drawings. When in said normal down position, the deck panel is supported by the stop means K and the rails R in combination with the adjacent effective areas of the side walls 11 of the bed and the closed tailgate G, retain cargo deposited on the panel P'. The bows and skin of the structure occur in down and folded condition beneath the panel P' and the columns C are stored therewith.

When it is desired to set up or open the tent structure, the deck panel P' is cleared of cargo, the latch means L for the gate G are released and the secondary frame F' or deck panel P' is manually engaged, as by the rail R at one side of the bed and is pivoted upwardly, rearwardly and downwardly, as indicated by the arrow U and into supported engagement with the ground J, as shown in FIGS. 1 and 4 of the drawings.

As the panel P' is thus moved, the skin S is simultaneously drawn or towed by the panel P' from within the confines of the primary frame unit F and moves, draws or tows the bows B, $B^1$ and $B^2$ through the arcs indicated by arrows V, W and X and in such a manner that the skin is effectively supported in its up or open condition by the bows.

As the panel P' engages the ground, the operator steps into the interior of the tent structure through the open O and pivots the secondary bow $B^3$ through the arc indicated by arrow Y, to support the rear most portion of the skin and subsequently manually engages the two colunns C, engages their upper ends with the bow $B^3$ and urges their lower ends, as indicated by arrow Z, into engagement with the panel P', thus completely setting up of the tent structure.

In the case of a tent structure A related to a 7 foot long truck bed and which establishes a tent approximately 14 feet long with 9 feet maximum head room, setting up or opening the tent structure, as set forth above can be effected in less then 30 seconds by a man of ordinary size, strength and skill.

Returning the tent structure, from its open position to its normal down position involves a simple reversal of the above noted steps and can be effected with equal ease and in no less time than is required to set up or open the structure.

In practice, and to facilitate proper folding of the fabric, when the tent is moved from its open position to its normal closed position, I provide resilient battens established of spring wire or of resilient metal or plastic ribbon stock, engaged in socks or the like, stitched to the skin S, between the several bows and which serve to yieldingly urge the skin into desired folded relationship as it is relieved of those tensile forces applied through it when the structure is in its open position.

In one preferred form of the invention, and as shown in FIG. 4 of the drawings, battens 65 established of flexible plastic strap stock and formed with integral intermediate sections 65' which function as spring loaded hinge means, are cemented or otherwise bonded to the interior of the skin S as circumstances require.

It is to be understood that in practice, the function to be performed by the battens can be performed by many other suitable means without departing from the spirit of my invention.

Further, in practice, a means (not shown) is preferably provided to releasably secure the panel P' to the member 21 of the frame F and/or the stop means K, whereby the tent structure A' is secured together, as a unit. This enables the structure A, upon release of the mounting means M, to be slidably removed from engagement in and with the truck, as for storage, in a most convenient manner.

In carrying out my invention, the vertical distance between the panels P and P', when the structure A is in its normal position, need only be about 3 inches to accommodate the bows and the skin, but is preferably of sufficient vertical extent so that the bows occur above and rest on the wheel wells 13 within the bed I. The wells are frequently about 5 inches to 6 inches in vertical extent and the vertical spacing of the panels P and P' is therefore made to be about 8 inches to 9 inches. As a result of the above, there is normally provided substantial storage space within the frame unit F and below the panel P' and in which a large mattress, bedding and various housekeeping items can be stored and which are presented for immediate and present use as the tent structure is open.

It is significant to note that the instant invention incorporates and utilizes the tailgate G and hinges H thereof in the tent structure and that said tailgate and hinges are so related to the panels P and P', and to the bows, pivot means E for the bows and to the skin S, that a tent structure of extraordinary length and ceiling height, having two effective floor or deck levels, both supported clear of and above the ground J, is provided.

Figure 10:
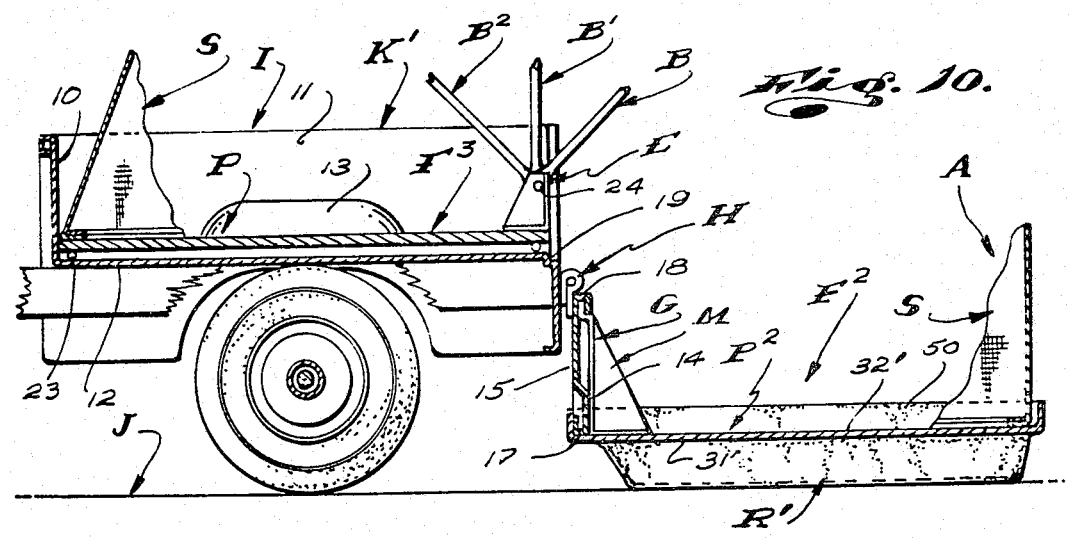
FIG. 10 is an enlarged sectional view of the structure shown in FIG. 9.
Figure 11:
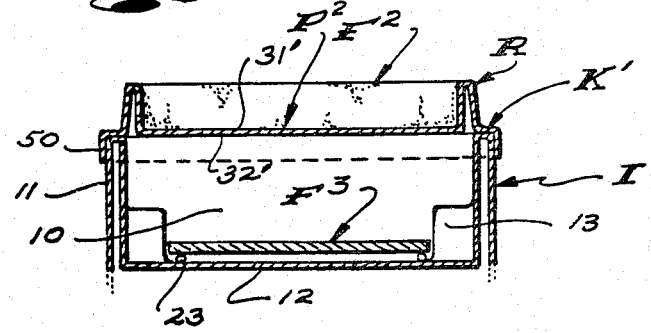
FIG. 11 is a view taken substantially as indicated by lines 11—11 on FIG. 9.

In FIGS. 9, 10 and 11 of the drawings, I have shown another or modified form of the invention wherein the second or upper frame unit $F^2$ is in the nature of a lid or cover from the truck bed I and wherein the top edges of the front end and side walls 10 and 11 of the bed I establish or define stop means K' for the unit $F^2$.

It will be apparent that by utilizing the walls of the bed I to establish the stop means K' for the frame unit $F^2$, the first or lower frame unit $F^3$ is greatly simplified, lighter and less costly to manufacture. Another advantage found in this second form of the invention resides in the fact that greater vertical storage space is provided between the units $F^2$ and $F^3$ when the structure is in its normal folded or down position. Further, in some instances, due to the configuration and/or construction of some truck beds, the second form of the invention attains better utilization of the lateral extent of the bed, that is, it enables the tent structure to be made wider than it could be made, utilizing the first form of the invention.

In the form of the invention now under consideration, the unit $F^2$ is a molded plastic or formed fiberglass unit which defines the panel $P^2$ of the unit with its top and bottom surfaces 31' and 32'. The perimeter portion of the bottom surface 32' normally sets on the top edges of the bed I. The unit $F^2$ can, as shown, be provided by a normally downwardly projecting flange 50 about its perimeter which flange engages about the exterior of the bed I and of the tailgate G, along the upper edges thereof to normally orient the unit $F^2$ with the truck structure and which provides a weather flashing or seal which prevents rain water and the like from entering the bed.

Further, in the form of the invention now under consideration, the side rail means R' comprises laterally spaced, longitudinally extending, vertically projecting wall-like rail portions formed integrally with the panel $P^2$.

In practice, and as illustrated, the means R' includes a laterally extending wall-like projection joined with and extending between the forward ends of the side rails.

In all other respects, the second form of the invention now under consideration is essentially the same as the first form of the invention. Accordingly, when appropriate, like or equivalent means, parts and portions of the second form of the invention are identified by the same reference numbers and characters which identify corresponding means, parts and portions in the first form of the invention.

Having described only preferred forms of my invention, I do not wish to be limited to the specific details herein set forth, but wish to reserve to myself any modifications and/or variations that may appear to those skilled in the art to which this invention relates and which falls within the scope of the following claims:

Having described my invention, I claim:

1. A camping attachment for a pick-up truck having front and rear ends, an elongated, longitudinally extending, upwardly and rearwardly opening utility bed at said rear end, said bed defined by front and side walls with upper edges and a bottom wall, a transversely extending tailgate having front and rear surfaces and top and bottom edges, and pivotal hinge means between said bottom edge and the rear of said bed whereby said tailgate may pivot 180° between a first, bed closing position wherein said top edge is substantially directly above said bottom edge, and a second, bed opening position wherein said top edge is substantially directly beneath said bottom edge, said attachment comprising: an elongated, flat, horizontal, primary frame unit adapted to be positioned in free, coextensively overlying engagement with said bottom wall; upwardly disposed stop means adapted to be fixed in vertically spaced relationship above said primary frame unit adjacent said front and side walls of said bed; pivot means mounted on opposite, rear sides of said primary frame unit adjacent said side walls of said bed, said pivot means defining a transverse axis spaced above said primary frame unit and below said stop means; at least three U-shaped bows, each of said bows having parallel legs and a transversely extending base connecting said legs, the free ends of said legs being pivotally mounted on said pivot means about said transverse axis, a first one of said bows being pivoted between a first, forwardly extending horizontal position and a second, rearwardly and upwardly extending position, a second one of said bows being pivoted between a first, forwardly extending horizontal position and a second vertically and upwardly extending position and a third one of said bows being pivoted between a first forwardly extending horizontal position and a second forwardly and upwardly extending position; a flat, deck panel; means adapted for releasably mounting said deck panel on said tailgate in cantilever relationship, whereby said deck panel rests on said stop means when said tailgate is in said first, bed closing position, and said deck panel extends horizontally outwardly from said truck when said tailgate is in said second, bed opening position; support means mounted on said deck panel to engage the ground when said tailgate is in said second position; a flexible fabric, tent skin, said skin comprising an elongated central portion having a front end secured to the front end of said primary frame unit and a rear end secured to the outwardly extending end of said deck panel, and side portions connected to said central portion and secured to the side edges of said primary frame unit and said deck panel; and coupling means securing said bows to said central portion at predetermined positions therealong whereby said skin lies in folded position and said bows lie in said first horizontal position when said tailgate is in said first, bed closing position, and said skin is held in a taut, unfolded position by said bows being positioned in said second positions, respectively, when said tailgate is in said second, bed opening position.

2. An attachment as set forth in claim 1 wherein the primary frame includes a floor panel overlying the bottom wall.

3. An attachment as set forth in claim 1 and further comprising: a secondary U-shaped bow having legs pivotally mounted on the legs of said first U-shaped bow, said secondary bow being pivoted between a first position parallelly adjacent to said first bow and a second position extending substantially horizontally rearwardly when said first bow is in its second, rearwardly and upwardly extending position; and means extending between said first bow and said secondary bow for releasably holding said secondary bow in said second, substantially horizontally extending position.

4. An attachment as set forth in claim 3 which further includes substantially vertical support columns engaged between the secondary bow and the deck panel when the secondary bow is in its horizontal position and said deck panel extends horizontally outwardly from the truck structure in its open position.

5. An attachment as set forth in claim 4 wherein said support means includes normally upwardly projecting longitudinally extending side rails on the deck panel, said side rails depending from the deck panel and engaging the ground when said panel extends horizontally outwardly from the truck.

6. An attachment as set forth in claim 1 wherein said support means includes normally upwardly projecting longitudinally extending side rails on the deck panel, said side rails depending from the deck panel and engaging the ground when the tailgate is in its second position, said rails being vertically adjustable whereby the vertical distance between the rails and the deck panel can be varied.

7. An attachment as set forth in claim 1 wherein the primary frame unit includes a floor panel overlying the bottom wall, said support means includes normally upwardly projecting longitudinally extending side rails on the deck panel, said side rails depending from the deck panel and engaging the ground when the deck panel is positioned to extend horizontally outwardly from the truck.

8. An attachment as set forth in claim 1 wherein said first bow pivotally carries a secondary U-shaped bow of limited longitudinal extent which normally occurs in a common flow with said first bow and is pivoted to extend substantially horizontally rearwardly therefrom and supports a portion of the skin occurring rearward of the rearmost bow when said first bow is in its second position, said support means includes normally upwardly projecting longitudinally extending side rails on the deck panel, said side rails depending from the deck panel and engaging the ground when the deck panel is positioned to extend horizontally outwardly from the truck.

9. An attachment as set forth in claim 1 wherein said bed has laterally inwardly and upwardly projecting wheel wells at its opposite sides and intermediate its ends, said primary frame unit being relieved at its opposite sides below the plane of the stop means and the plane of the bows when they are in their first positions to accommodate said wheel wells.

* * * * *